US008267590B2

(12) United States Patent
Kono et al.

(10) Patent No.: US 8,267,590 B2
(45) Date of Patent: Sep. 18, 2012

(54) PLUNGER DRIVING STRUCTURE

(75) Inventors: Shingo Kono, Iwata (JP); Hisataka Hasegawa, Fukuroi (JP); Masahiko Satoda, Kariya (JP); Nobuhiro Kasahara, Iwata (JP); Masakuni Suzuki, Toyota (JP)

(73) Assignee: NTN Corporation, Osaka (JP)

( * ) Notice: Subject to any disclaimer, the term of this patent is extended or adjusted under 35 U.S.C. 154(b) by 575 days.

(21) Appl. No.: 11/525,972

(22) Filed: Sep. 25, 2006

(65) Prior Publication Data

US 2007/0071621 A1 Mar. 29, 2007

(30) Foreign Application Priority Data

Sep. 26, 2005 (JP) ................................ 2005-277562
Sep. 26, 2005 (JP) ................................ 2005-277563
Sep. 26, 2005 (JP) ................................ 2005-277564

(51) Int. Cl.
*F16C 19/00* (2006.01)
*F16C 19/50* (2006.01)

(52) U.S. Cl. ....................................... 384/447; 384/462

(58) Field of Classification Search ................ 74/25, 47, 74/595–605; 384/447, 462, 473, 548; 123/196 R, 123/198 C; 417/237, 273
See application file for complete search history.

(56) References Cited

U.S. PATENT DOCUMENTS 3,689,199 A * 9/1972 Bassinger ..................... 417/273
4,997,344 A * 3/1991 Nelson et al. ................. 417/273
5,338,160 A * 8/1994 Thurner ........................ 417/273
5,362,158 A * 11/1994 Hashimoto et al. ........... 384/447
6,202,538 B1 * 3/2001 Scharinger et al. ............... 92/72
6,240,826 B1 * 6/2001 Zernickel et al. ................. 92/72

FOREIGN PATENT DOCUMENTS

JP 3-172608 A 7/1991
JP 5-83372 11/1993
JP 6-185454 A 7/1994
JP 8-28437 A 1/1996
JP 10-71518 A 3/1998
JP 10-288146 A 10/1998
JP 2002-256384 A 9/2002
JP 2005-82922 A 3/2005
JP 2005-240654 A 9/2005

* cited by examiner

*Primary Examiner* — Thomas R Hannon
*Assistant Examiner* — Phillip A Johnson
(74) *Attorney, Agent, or Firm* — Clark & Brody

(57) ABSTRACT

An oil pump comprises a rotation shaft having an eccentric part, a needle roller bearing supporting the eccentric part of the rotation shaft, a tappet abutting on the outer ring of the needle roller bearing and arranged in a radial manner, a plunger arranged on the tappet and reciprocated by the rotation of the rotation shaft, and a balancer arranged on both ends of the eccentric part. The balancer has a large diameter part and a small diameter part and when the large diameter part is arranged so as to face the direction opposite to an eccentric direction, the rolling space of a roller can be projected from an axial direction through the balancer.

8 Claims, 9 Drawing Sheets

PLUNGER DRIVING STRUCTURE

BACKGROUND OF THE INVENTION

1. Field of the Invention

The present invention relates to a plunger driving structure used in a fuel pump of a diesel engine, an oil pump of a brake system and the like.

2. Description of the Background Art

Conventionally, an oil pump used in a car brake system and the like has been disclosed in Laid-open Japanese utility model publication No. 5-83372. As shown in FIG. 9, an oil pump 1 according to the document comprises a rotation shaft 2 having an eccentric part 2*a*, a ball bearing 3 supporting the eccentric part 2*a* of the rotation shaft 2, a tappet 4 arranged on the ball bearing 3 in a radial manner, and a plunger 5 arranged on the tappet 4 and reciprocated by the rotation of the rotation shaft 22.

In addition, as shown in FIG. 10, the ball bearing 3 comprises an inner ring 3*a*, an outer ring 3*b*, a plurality of balls 3*c* arranged between the inner ring 3*a* and the outer ring 3*b*, a retainer 3*d* retaining the balls 3, and a seal 3*e* arranged at both ends of the bearing to seal the inner space of the bearing.

The above oil pump 1 inhales and pressure feeds an oil while the plunger 5 is moved vertically by the rotation of the rotation shaft 2.

In addition, in the above document, it is pointed out that the eccentric part 2*a* of the rotation shaft 2 becomes unbalanced in its driven state, causing an oscillation and the like to damage the bearing and the output shaft of a motor and the like and to raise the operation sound of a transmission pump, as problems.

Thus, in order to solve the above problems, a balancer 6 having a large diameter part 6*a* and a small diameter part 6*b* is used as shown in FIG. 11. More specifically, when the large diameter part 6*a* is arranged at both ends of the eccentric part 2*a* so as to face the direction opposite to the eccentric direction, the dynamic unbalance while the rotation shaft is driven can be corrected by using a difference in centrifugal force between the large diameter part 6*a* and the small diameter part 6*b*.

When the distance between the eccentric part 2*a* and the balancer 6 is large in the above plunger driving structure, since an oscillation could be generated at the time of driving, the distance between the ball bearing 3 and the balancer 6 is 0.3 mm to 0.47 mm in general, which is very small.

Although it is no problem in the bearing such as the ball bearing 3 in which grease is enclosed in the space in the bearing sealed by the seal 3*e*, the balancer 6 could prevent the lubricant from flowing into the bearing in the bearing that requires the lubricant to be supplied from the outside.

Meanwhile, as the miniaturization of the oil pump is increasingly demanded recently, it is considered that a needle roller bearing that is a small in thickness in the diameter direction and the like is used instead of the ball bearing 3. According to the needle roller bearing, however, the lubricant is to be supplied from the outside in general and the distance formed between track rings is small, so that it is inevitable that the lubricant supply is insufficient due to the balancer 6.

In addition, although the rotation shaft 2, the inner ring 3*a* and the balancer 6 are integrally rotated in the above plunger driving structure, since the outer ring 3*b* is fixed, friction resistance is generated at the contact part between the wall surface of the balancer 6 and the end surface of the outer ring 3*b*. This friction resistance could cause an abnormal noise or oscillation while the oil pump 11 is driven.

Furthermore, surface finish such as grinding is not performed on the wall surface of the balancer 6. Meanwhile, grinding is performed on the end surface of the outer ring 3*b* to be a reference surface in an early stage, but even when it is scratched at a subsequent processing step, it is left as it is. As a result, the contact surfaces are rough and it is considered that this roughness causes an increase in friction resistance.

SUMMARY OF THE INVENTION

It is an object of the present invention to provide a plunger driving structure comprising a balancer having a configuration that does not prevent a lubricant from flowing into a bearing to support an eccentric part.

It is another object of the present invention to provide a plunger driving structure in which rotation resistance at a contact part between a bearing and a balancer is reduced and an abnormal noise or oscillation at the time of driving is suppressed.

A plunger driving structure according to the present invention comprises a rotation shaft having an eccentric part, a roller bearing comprising an outer ring and a plurality of rollers arranged along the track surface of the outer ring and supporting the eccentric part, a balancer arranged at a position adjacent to the roller bearing at the rotation shaft, and a plunger abutting on the outer ring and reciprocated by the rotation of the rotation shaft. Thus, the rolling space of the roller can be projected from an axial direction through the balancer.

As a concrete configuration of the balancer, the outer diameter outline of the balancer intersects with the circumscribed circle of the rollers. Alternatively, the balancer has a through hole in its wall surface opposed to the rolling space of the roller. In addition, the “circumscribed circle of the roller” in this specification designates a circle provided such that points where the rollers are in contact with the outer ring track surface are connected. In addition, the “rolling space of the roller” designates a space sandwiched by the inner ring track surface and the outer ring track surface.

According to the above constitution, since the lubricant can be smoothly supplied to the roller bearing supporting the eccentric part, the plunger driving structure can be superior in lubricating performance.

Preferably, the roller bearing is a needle roller bearing comprising needle rollers as the rollers. When the present invention is applied to the plunger driving structure comprising the needle roller bearing in which the lubricating property is largely influenced by the existence of the balancer, a greater effect can be expected.

Preferably, the balancer has a small diameter part and a large diameter part, and the outline of the small diameter is positioned inside the inner diameter of the outer ring. According to the above structure, since the wall surface of the small diameter part of the balancer and the bearing outer ring are not in contact with each other, the rotation resistance at the time of driving can be reduced. As a result, the plunger driving structure in which an abnormal noise or oscillation is suppressed can be provided.

Preferably, the end surface of the large diameter part in a circumferential direction has a chamfered part. Since higher rotation resistance is generated when the corner part of the end surface of the large diameter part in the circumferential direction, that is, the end surface of the large diameter part that is in contact with the small diameter part comes into contact with the end surface of the outer ring, the abnormal noise or oscillation can be effectively suppressed by chamfering the corner part.

Preferably, the surface roughness of the end surface of the outer ring opposed to the balancer is Rz≦0.8 μm, and the surface roughness of the wall surface of the balancer opposed to the outer ring is Rz≦3.2 μm. As describe above, when the surface roughness of the end surface of the outer ring and the wall surface of the balancer that are in contact with each other are set to the predetermined value or less, the rotation resistance at the time of driving can be reduced. As a result, the plunger driving structure in which the abnormal noise or oscillation is suppressed can be provided. In addition, the "Rz" in this specification designates the surface roughness using ten-point average roughness.

Preferably, the end surface of the outer ring opposed to the balancer is lapped. In addition, preferably, the wall surface of the balancer opposed to the outer ring is barreled. Thus, the surface roughness of the contact surface can be the predetermined value or less.

In addition, the "lapping" in this specification designates a method in which a product is slid on a lapping plate that is covered with a processing liquid mixed with abrasive grains while it is pressurized, to finish the surface with high precision. In addition, the "barreling" designates a grinding method in which a product is put in a barrel-shaped container together with a particulate abrasive material and a compound and the barrel-shaped container is rotated and moved vertically.

According to the present invention, the balancer having the structure that does not prevent the lubricant from flowing to the bearing to support the eccentric part is used, so that the plunger driving structure in which the lubricating property is excellent can be provided.

In addition, according to the present invention, the plunger driving structure in which the rotation resistance at the time of driving is reduced and the abnormal noise or oscillation is suppressed can be provided by smoothing the end surface of the outer ring and the wall surface of the balancer that are in contact with each other.

DESCRIPTION OF THE PREFERRED EMBODIMENTS

A plunger driving structure for an oil pump according to one embodiment of the present invention will be described with reference to FIGS. 1 to 3 hereinafter.

Figure 1:
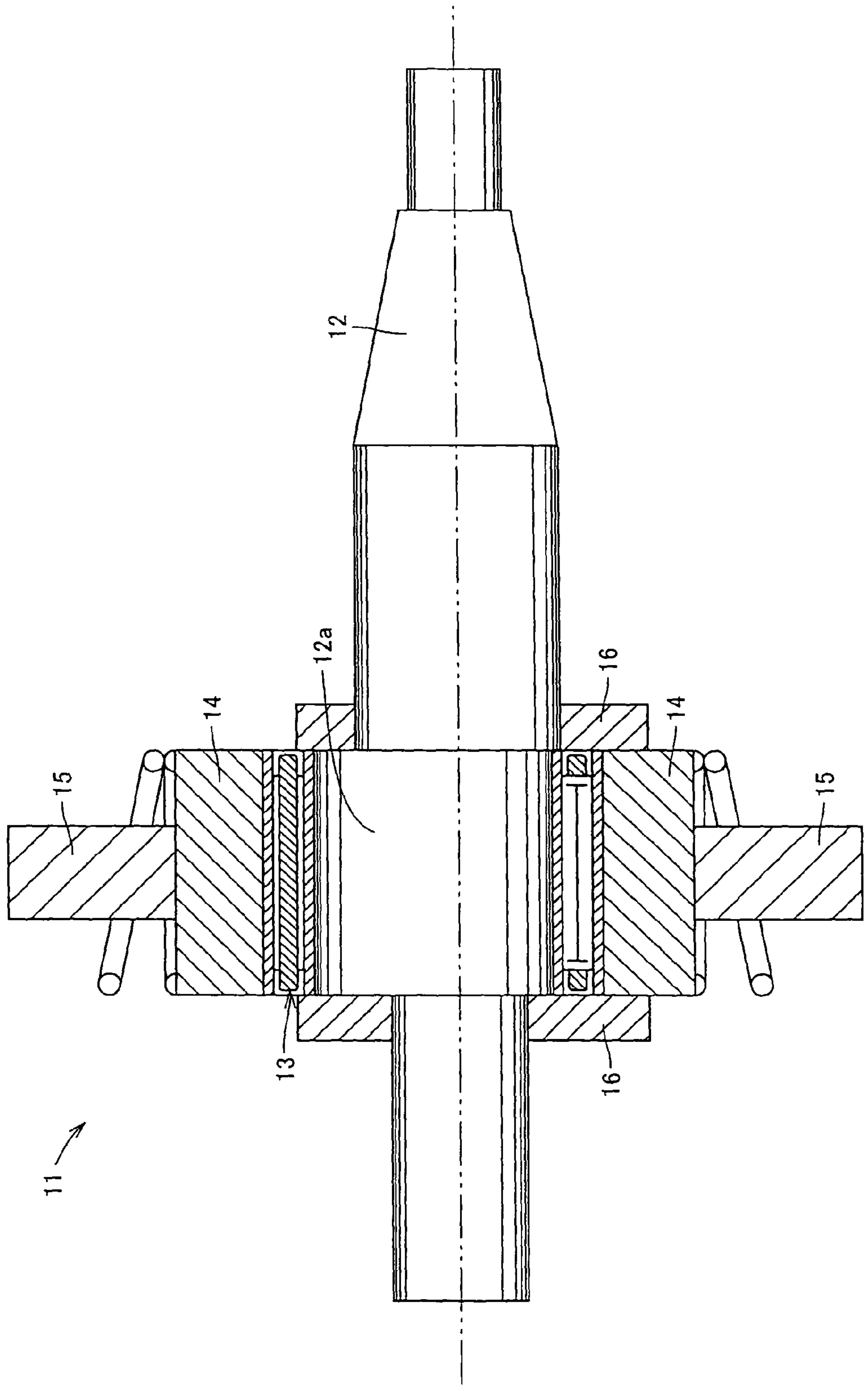
FIG. 1 is a view showing a plunger driving structure for an oil pump according to one embodiment of the present invention.

As shown in FIG. 1, an oil pump 11 comprises a rotation shaft 12 having an eccentric part 12*a*, a needle roller bearing 13 supporting the eccentric part 12*a* of the rotation shaft 12, a tappet 14 abutting on the outer ring of the needle roller bearing 13 and arranged in a radial manner, a plunger 15 arranged on the tappet 14 and reciprocated by the rotation of the rotation shaft 12, and a balancer 16 arranged both ends of the eccentric part 12*a*.

Figure 2:
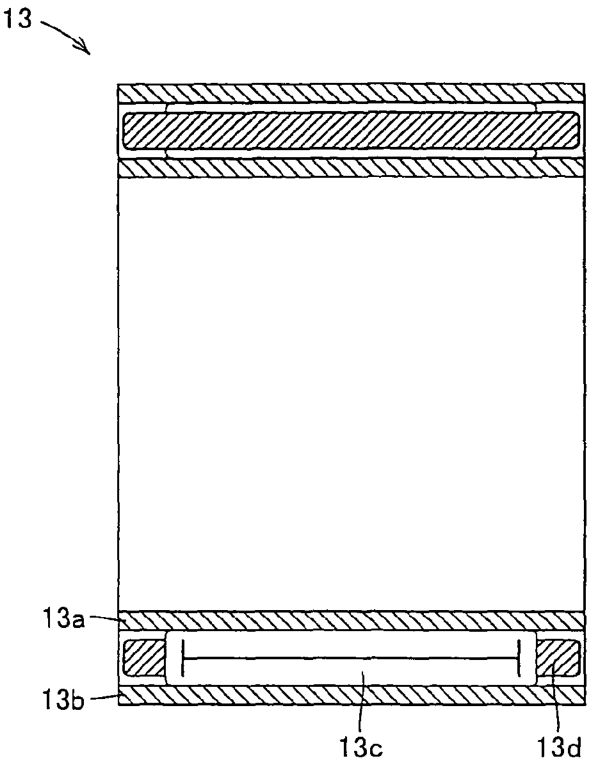
FIG. 2 is a view showing a needle roller bearing used in FIG. 1.

As shown in FIG. 2, the needle roller bearing 13 comprises an inner ring 13*a*, an outer ring 13*b*, a plurality of needle rollers 13*c* arranged between the inner ring 13*a* and the outer ring 13*b*, and a retainer 13*d* retaining the needle rollers 13*c*. Alternatively, the needle roller bearing 13 may be a bearing that does not have the inner ring 13*a* and comprises needle rollers 13*c* arranged along the track surface of the outer ring 13*b*. When such needle roller bearing 13 is used as the bearing for supporting the eccentric part 12*a*, the oil pump 11 can be miniaturized.

Figure 3:
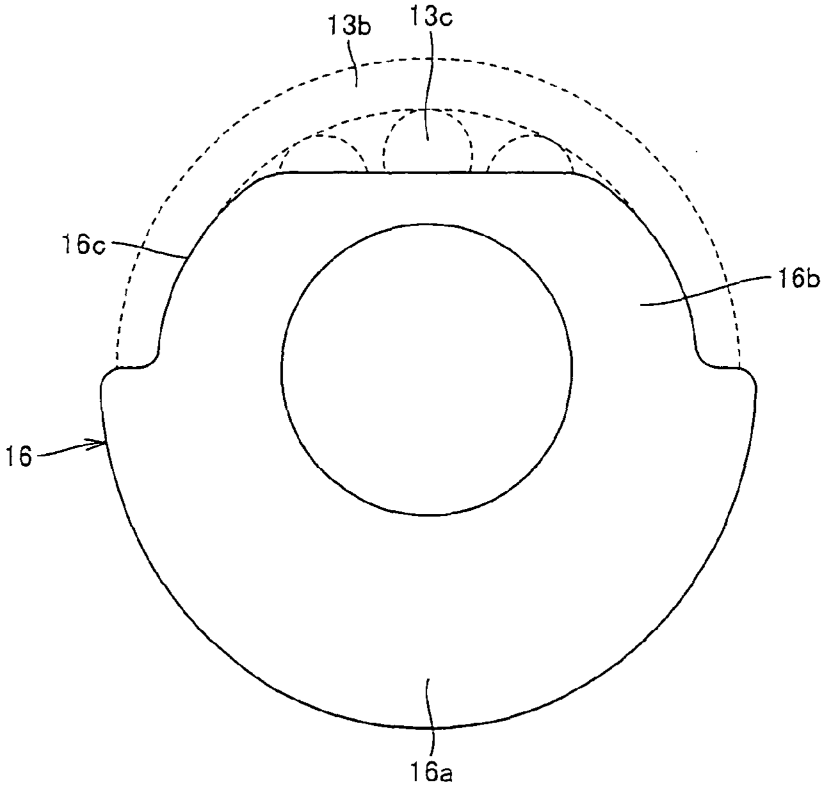
FIG. 3 is a view showing a balancer used in FIG. 1.

As shown in FIG. 3, the balancer 16 has a large diameter part 16*a* and a small diameter part 16*b* and an outer diameter outline 16*c* intersects with the circumscribed circle of the rollers 13*c*. When the balancer 16 is arranged such that the large diameter part 16*a* may face the direction opposite to the eccentric direction as shown in FIG. 1, the rolling space of the roller 13*c* can be projected from the axial direction through the balancer 16.

The oil pump 11 can be miniaturized by using the needle roller bearing 13 that is small in thickness in the diameter direction as the bearing to support the eccentric part 12*a*. At the same time, since the balancer shown in FIG. 3 does not prevent the flow of a lubricant supplied to the needle roller bearing 13, the plunger driving structure can be superior in lubricating property.

In addition, according to the oil pump 11 having the above constitution, the end surface of the outer ring 13*b* that is opposed to the balancer 16 is lapped so that its surface roughness becomes Rz≦0.8. Furthermore, the wall surface of the balancer 36 that is opposed to the outer ring 13*b* is barreled so that its surface roughness becomes Rz≦3.2. At this time, it is to be noted that no projected scratch is to be left especially.

As described above, when the end surface of the outer ring 13*b* and the wall surface of the balancer 16 that are in contact with each other when the oil pump 11 is driven are smoothed, the rotation resistance at the time of driving can be reduced. As a result, the plunger driving structure in which an abnormal noise or oscillation is suppressed can be provided.

Figure 5:
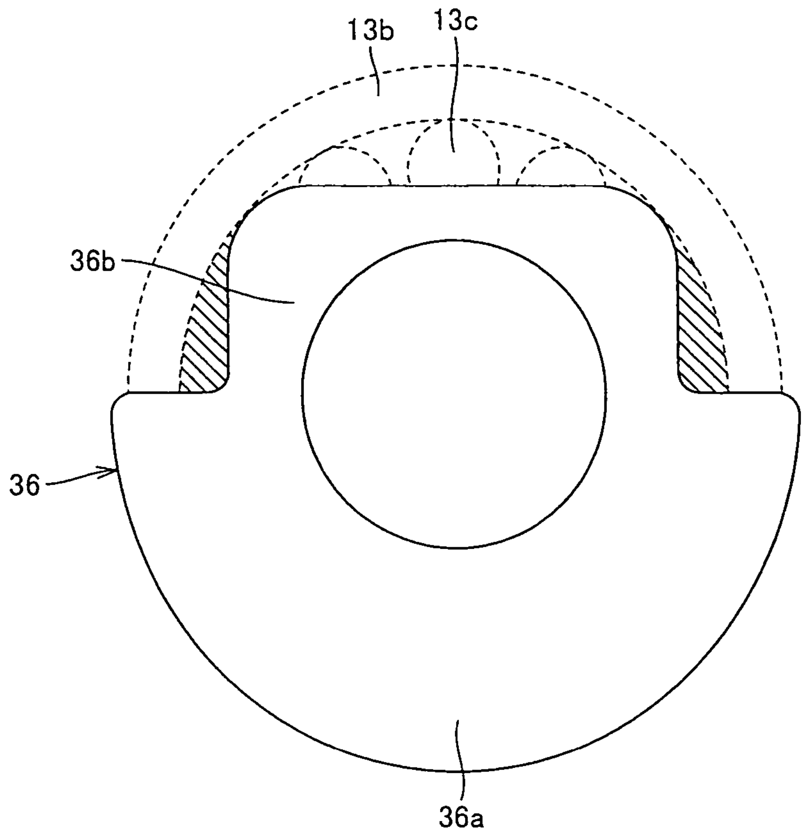
FIG. 5 is a view showing a balancer according to another embodiment.

In addition, as the balancer used in the above oil pump 11, a balancer 36 shown in FIG. 5 may be used. According to the balancer 36, rotation resistance between the outer ring 13*b* and the balancer 36 can be more reduced when the oil pump 11 is driven in addition to the above effect.

In addition, although the example in which the large diameter part 16*a* and the small diameter 16*b* are provided and the center of the arc of the small diameter part 16*b* is cut is shown in the above embodiment, the present invention is not limited to this. For example, a through hole may be provided in the wall surface of the balancer on one side.

Figure 4A:
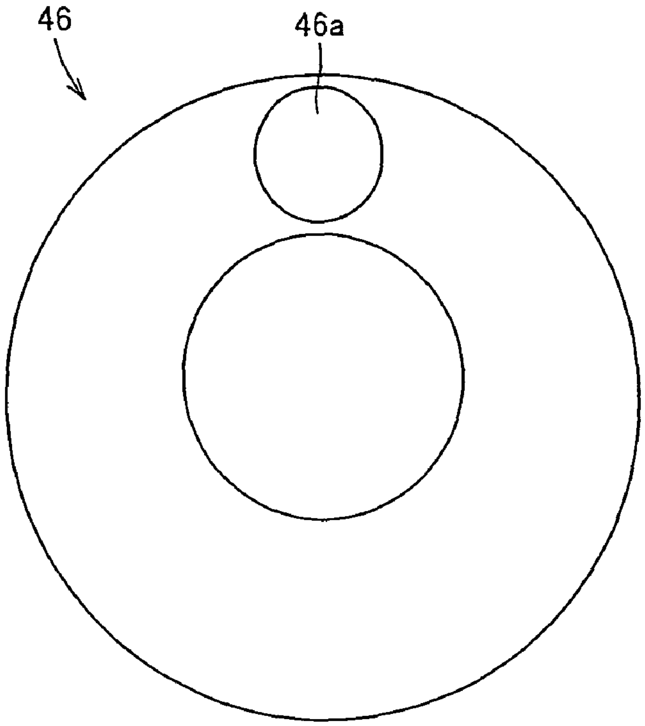
FIG. 4A is a view showing a balancer according to another embodiment.
Figure 4B:
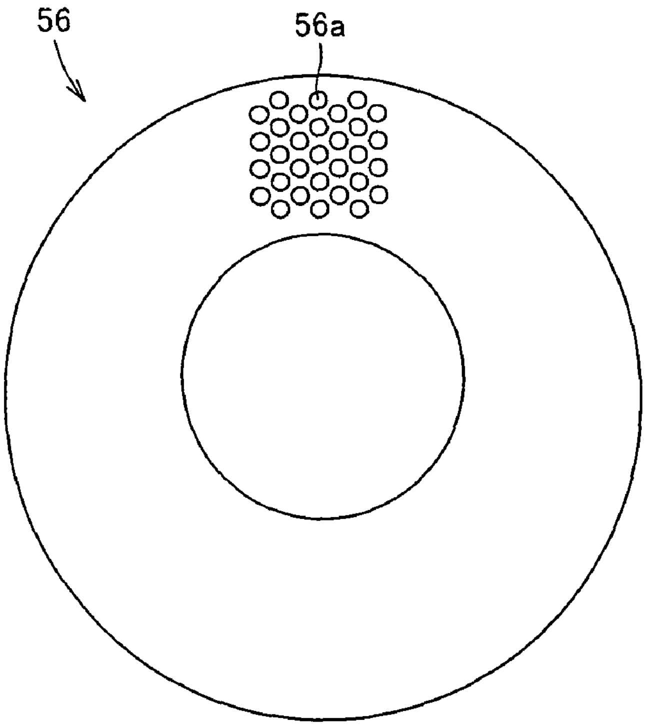
FIG. 4B is a view showing a balancer according to another embodiment.

For example, like a balancer 46 shown in FIG. 4A, a large through hole 46*a* may be provided or like a balancer 56 shown in FIG. 4B, small through holes 56*a* may be provided. In this case, a lubricant can be supplied to the bearing through the through holes 46*a* and 56*a*, and the degree of centrifugal force can be adjusted according to the size or the number of the through holes 46*a* and 56*a* without providing the small diameter part and the large diameter part in the balancers 46 and 56.

Figure 6:
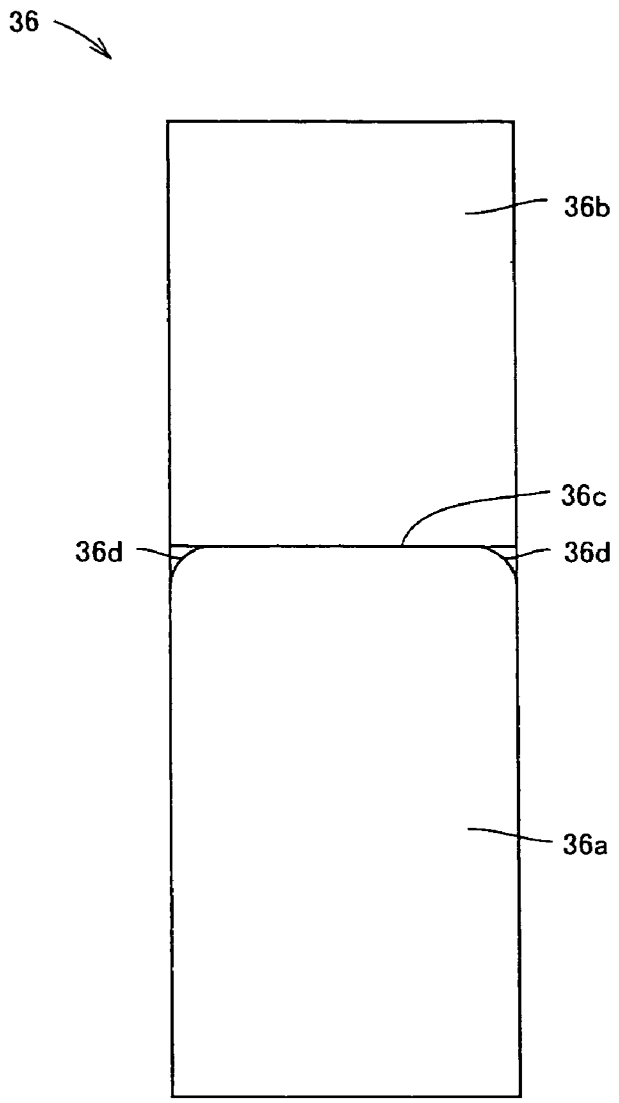
FIG. 6 is a side view showing the balancer shown in FIG. 5.

Another embodiment of the balancer will be described with reference to FIGS. 5 and 6 hereinafter. In addition, the point common to the above embodiment will be omitted and the point different from the above will be described.

Since a higher rotation resistance is generated at a shaded area and a corner part 36*b* in FIG. 5 when they are in contact with the end surface of the outer ring, an abnormal noise or oscillation can be effectively prevented by cutting the shaded area and chamfering the corner part 36*b*.

In addition, the chamfering of the corner part 36*b* is performed by a tumbling process. The tumbling process is a process in which the balancer 36 and iron pieces are put in a rotation drum and rotated to round the corner part 36*b* by friction or impact.

According to the above balancer 36, dynamic unbalance when the rotation shaft 12 is driven can be corrected by using a difference in centrifugal force between the large diameter part 16*a* and the small diameter part 16*b* when the large diameter part 16*a* is arranged so as to face the direction opposite to the eccentric direction as shown in FIG. 1.

In addition, the balancer 36 has a large diameter part 36*a* and a small diameter part 36*b*, and a shaded area in the drawing is cut so that the outline of the small diameter 36*b* may be positioned inside the outer ring 13*b*. Thus, the rotation resistance between the outer ring 13*b* and the balancer 36 when the oil pump 11 is driven can be reduced.

In addition, as shown in FIGS. 4A and 4B, a through hole may be provided in the wall surface of the balancer 36. Thus, a lubricant can be supplied to the bearing through the through hole. In addition, as the bearing to support the eccentric part 12*a*, when the needle roller bearing 13 that requires the lubricant to be supplied from the outside is used, the effect can be expected more.

A plunger driving structure for an oil pump according to another embodiment of the present invention will be described with reference to FIGS. 7 and 8 hereinafter. In addition the point common to the above embodiment will be omitted and the point different to the above will be described.

Figure 7:
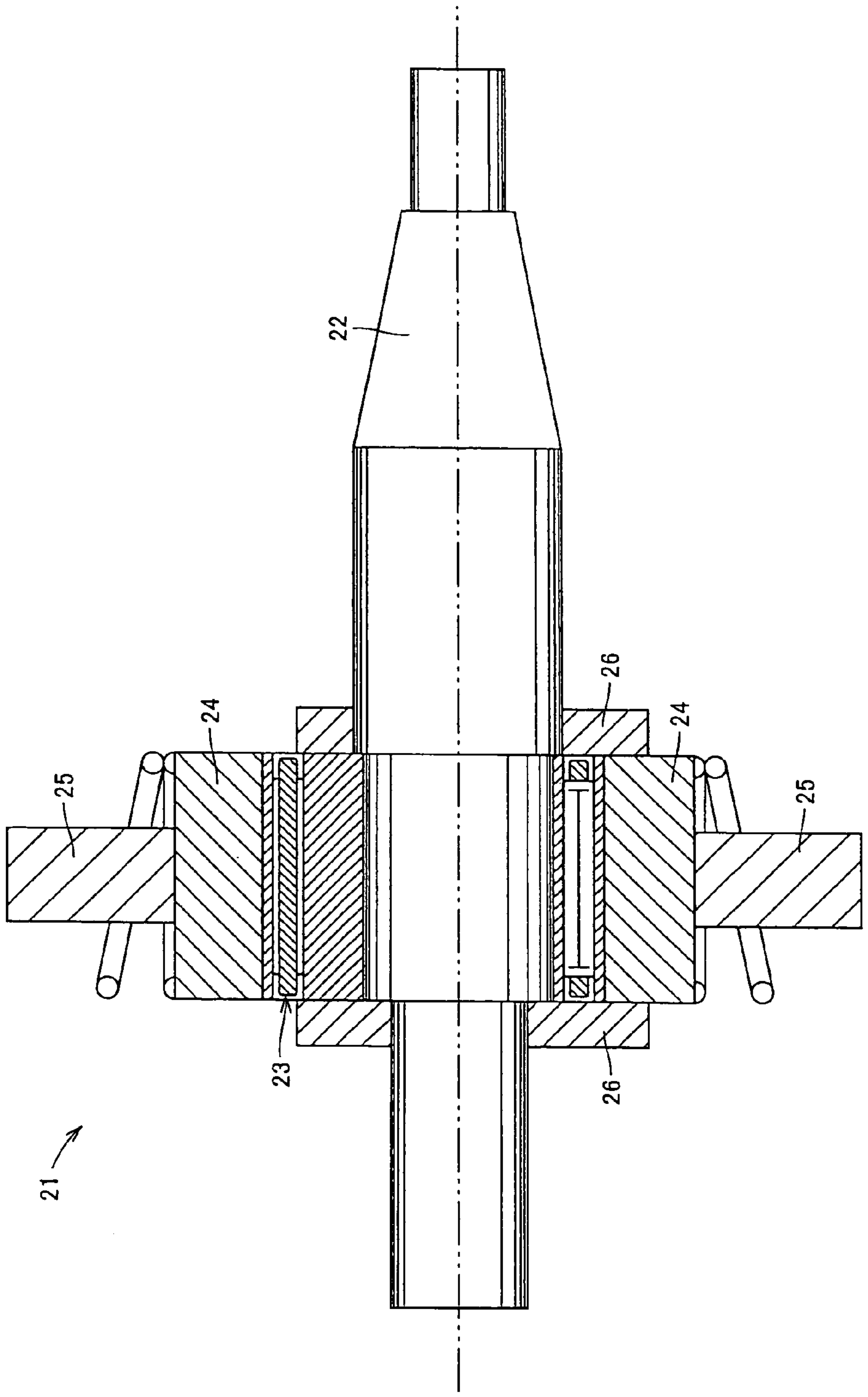
FIG. 7 is a view showing a plunger driving structure for an oil pump according to another embodiment of the present invention.

As shown in FIG. 7, an oil pump 21 comprises a rotation shaft 22, a needle roller bearing 23 supporting the rotation shaft 22, a tappet 24 abutting on the outer ring of the needle roller bearing 23 and arranged in a radial manner, a plunger 25 arranged on the tappet 24 and reciprocated by the rotation of the rotation shaft 22, and a balancer 26 arranged on both ends of the needle roller bearing 23 like the balancer shown in FIGS. 3 to 5.

Figure 8:
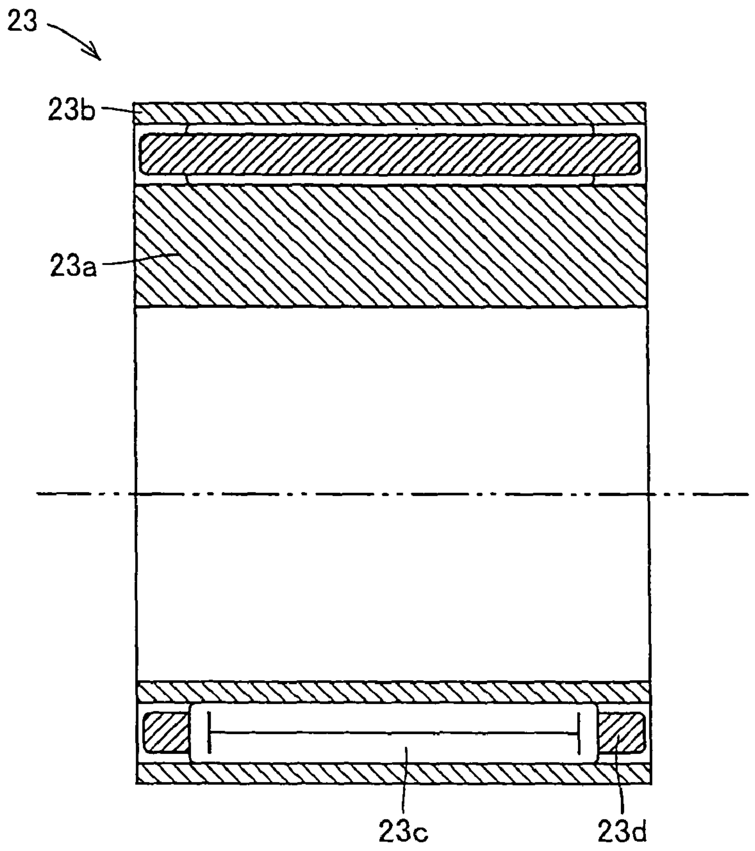
FIG. 8 is a view showing a needle roller bearing used in FIG. 7.
Figure 9:
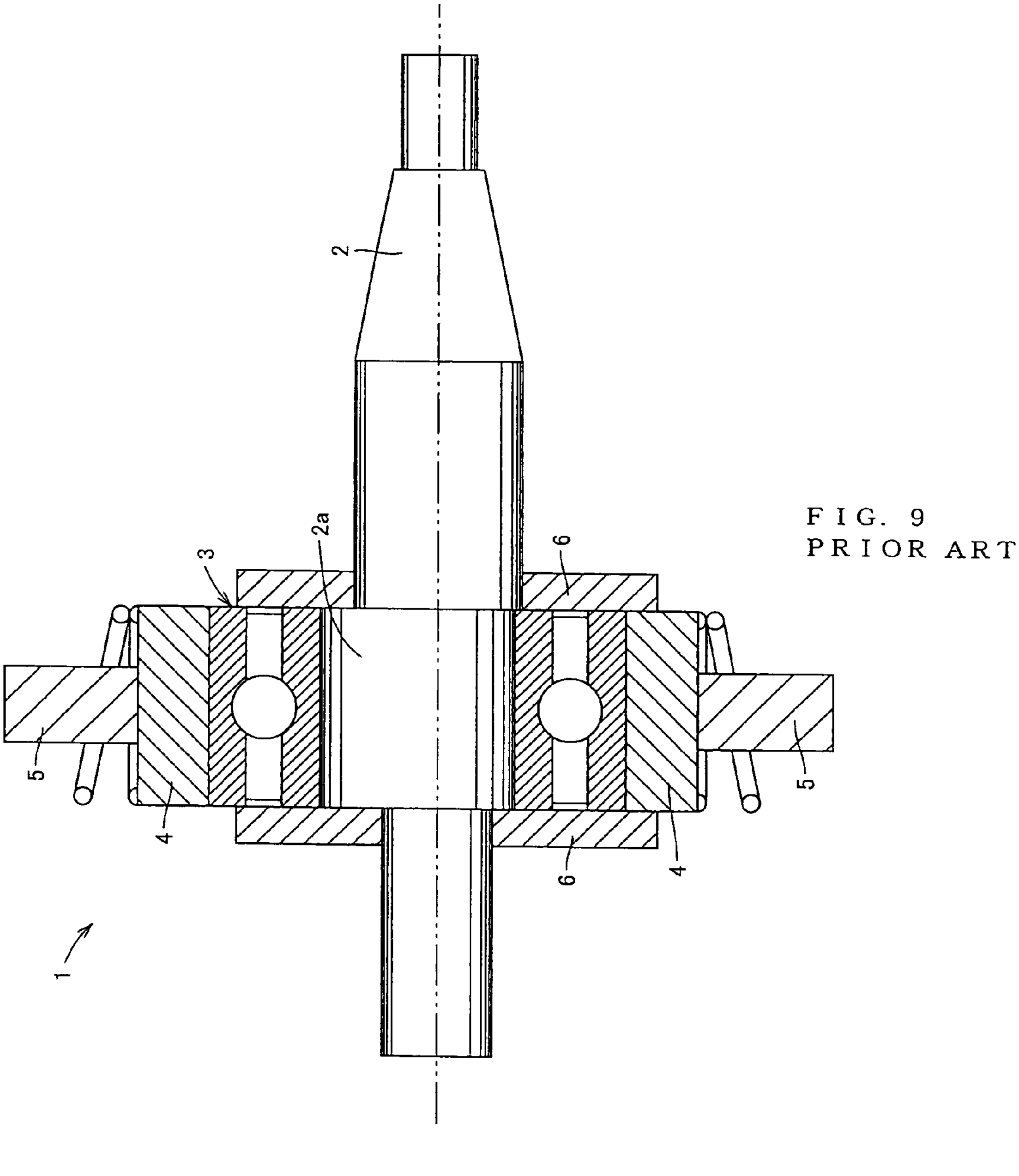
FIG. 9 PRIOR ART
FIG. 9 is a view showing a conventional plunger driving structure for an oil pump.
Figure 10:
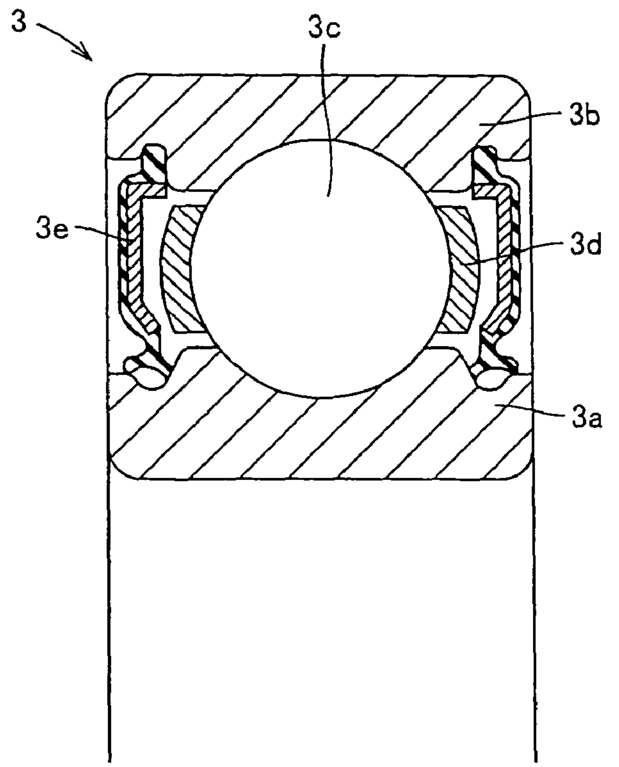
FIG. 10 PRIOR ART
FIG. 10 is a view showing a ball bearing used in FIG. 9.
Figure 11:
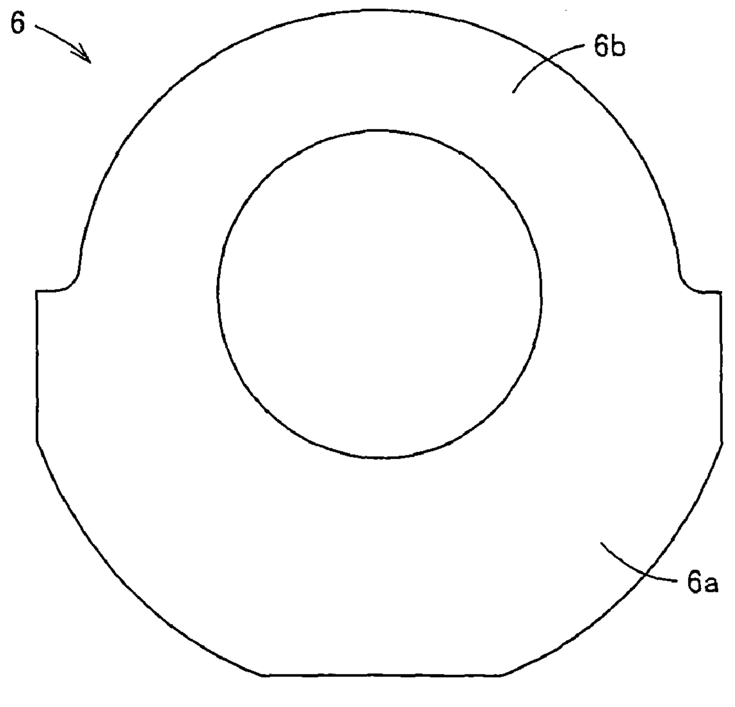
FIG. 11 PRIOR ART
FIG. 11 is a view showing a balancer used in FIG. 9.

In addition, as shown in FIG. 8, the needle roller bearing 23 comprises an eccentric inner ring 23*a* having different thicknesses in diameter direction circumferentially, an outer ring 23*b*, a plurality of needle rollers 23*c* arranged between the eccentric inner ring 23*a* and the outer ring 23*b*, and a retainer 23*d* retaining the needle rollers 23*c*.

Since this needle roller bearing 23 has the eccentric inner ring 23*a*, it is not necessary to provide an eccentric part at the rotation shaft 22. As a result, in addition to the effect provided in the embodiments shown in FIGS. 1 to 6, the manufacturing cost of the rotation shaft 22 can be reduced.

Although the needle roller bearings 13 and 23 shown in FIGS. 2 and 8 have the retainers 13*d* and 23*d* retaining the needle rollers 13*c* and 23*c*, respectively, the present invention is not limited to this. For example, the bearing may be a full type roller bearing in which adjacent needle rollers 13*a* or 23*c* are in contact with each other without the retainers 13*d* or 23*d*. Since the load capacity of the needle roller bearings 13 or 23 is increased as the number of needle rollers 13*c* or 23*c* is increased, when the full type roller bearing housing the needle rollers 13*c* or 23*c* as many as possible is used, the plunger supporting bearing can have high load capacity.

In addition, although the needle roller bearing is used as the bearing to support the eccentric part in the above embodiments, the present invention is not limited to this. The present invention can be applied to various kinds of bearings that require the lubricant to be supplied from the outside, and the same effect as the above can be expected.

In addition, although the balancer is applied to the plunger driving structure of the oil pump used in a car brake system shown in FIGS. 3 to 5 in the above embodiment, the present invention is not limited to this. For example, it can be applied to a plunger driving structure for a fuel pump in a diesel engine and the like.

Furthermore, according to the present invention, when the characteristic parts in the above embodiments are combined arbitrarily, a synergetic effect can be expected.

Although the embodiments of the present invention have been described with reference to the drawings in the above, the present invention is not limited to the above-illustrated embodiments. Various kinds of modifications and variations may be added to the illustrated embodiments within the same or equal scope of the present invention.

The present invention can be advantageously applied to the plunger driving structure for the oil pump.

What is claimed is:

1. A plunger driving structure comprising:

a rotation shaft having a single eccentric part;

a roller bearing comprising an outer ring and a plurality of rollers arranged along the track surface of said outer ring, and supporting said single eccentric part, a peripheral edge of the outer ring of the roller bearing supporting the single eccentric part and configured so as not to cover an end of the rollers;

a balancer arranged at a position adjacent to said roller bearing at said rotation shaft, a side face of the balancer abutting an end face of at least a portion of the outer ring and limiting movement of the rollers in the axial direction; and a plunger abutting on said outer ring and reciprocated by the rotation of said rotation shaft, wherein the balancer has a shaped configuration wherein a portion of the balancer has a shape not coincident with a shape of the outer ring so that when the balancer is arranged at the position adjacent to the roller bearing and the outer ring does not cover the end of the roller, a portion of one or more of the rollers of the roller bearing is exposed so that lubricant can be supplied in an axial direction to the roller bearing and the balancer with its shape covers all or a portion of the ends of the rollers facing the balancer.

2. The plunger driving structure according to claim 1, wherein the outer diameter outline of said balancer intersects with the circumscribed circle of said rollers.

3. The plunger driving structure according to claim 1, wherein said roller bearing is a needle roller bearing comprising needle rollers as said rollers.

4. The plunger driving structure according to claim 1, wherein said balancer has a small diameter part and a large diameter part, and the outline of said small diameter is positioned inside the inner diameter of said outer ring so as to form the shaped configuration to expose the portion of the one or more rollers.

5. The plunger driving structure according to claim 4, wherein the end surface of said large diameter part in a circumferential direction has a chamfered part.

6. The plunger driving structure according to claim 1, wherein the surface roughness of the end surface of said outer ring opposed to said balancer is R≦0.8 μm, and the surface roughness of the wall surface of said balancer opposed to said outer ring is Rz≦3.2 μm.

7. The plunger driving structure according to claim 6, wherein the end surface of said outer ring opposed to said balancer is lapped.

8. The plunger driving structure according to claim 6, wherein the wall surface of said balancer opposed to said outer ring is lapped.

* * * * *